(12) United States Patent
Jung et al.

(10) Patent No.: US 8,731,045 B2
(45) Date of Patent: May 20, 2014

(54) MOTION ENCODING AND DECODING

(75) Inventors: Joël Jung, Le Mesnil Saint-Denis (FR); Guillaume Laroche, Rennes (FR)

(73) Assignee: Orange, Paris (FR)

( * ) Notice: Subject to any disclaimer, the term of this patent is extended or adjusted under 35 U.S.C. 154(b) by 559 days.

(21) Appl. No.: 12/744,544

(22) PCT Filed: Nov. 19, 2008

(86) PCT No.: PCT/FR2008/052087
§ 371 (c)(1),
(2), (4) Date: May 25, 2010

(87) PCT Pub. No.: WO2009/071803
PCT Pub. Date: Jun. 11, 2009

(65) Prior Publication Data
US 2010/0266046 A1    Oct. 21, 2010

(30) Foreign Application Priority Data
Nov. 28, 2007  (FR) ...................... 07 08314

(51) Int. Cl.
*H04N 19/00* (2014.01)
*H04N 7/26* (2006.01)

(52) U.S. Cl.
CPC .................................... *H04N 19/00* (2013.01)
USPC ........................................................ 375/240

(58) Field of Classification Search
CPC ..................................................... H04N 19/00
See application file for complete search history.

(56) References Cited

U.S. PATENT DOCUMENTS

| | | | | |
|---|---|---|---|---|
| 5,565,922 A | * | 10/1996 | Krause | 375/240.14 |
| 5,719,631 A | * | 2/1998 | Pandel | 375/240.15 |
| 7,471,724 B2 | * | 12/2008 | Lee | 375/240.12 |
| 7,499,495 B2 | * | 3/2009 | Srinivasan | 375/240.16 |
| 2005/0036550 A1 | * | 2/2005 | Koba et al. | 375/240.12 |
| 2005/0226335 A1 | * | 10/2005 | Lee et al. | 375/240.16 |
| 2006/0153298 A1 | * | 7/2006 | Valente | 375/240.16 |
| 2009/0129472 A1 | * | 5/2009 | Panusopone et al. | 375/240.16 |

FOREIGN PATENT DOCUMENTS

EP    0 773 690 A2    5/1997

OTHER PUBLICATIONS

Jung et al, "Competition-Based Scheme for Motion Vector Selection and Coding", ITU-T VCEG/SG16 Q.6, Document VCEG-AC06, 29th Meeting, Kalgenfurt, Austria, Jul. 17-18, 2006, pp. 1-7.*
Laroche et al, "RD Optimized Coding for Motion Vector Predictor Selection", IEEE Trans. on Circuits and Systems for Video Technology, vol. 18, No. 9, Sep. 2008, pp. 1247-1257.*

(Continued)

*Primary Examiner* — Jay Patel
*Assistant Examiner* — Reza Aghevli
(74) *Attorney, Agent, or Firm* — Drinker Biddle & Reath LLP

(57) ABSTRACT

A method is provided for encoding a portion of a current image, including: an estimation of motion between the current image portion and a plurality of candidate image portions in order to form motion components, an evaluation of a performance criterion for each candidate image portion, and the selection of a reference image portion using said performance criteria. In the method, for at least one motion component, the motion estimation, the performance criteria evaluation and the reference image portion selection only use information considered to be available at the decoder and no motion information is inserted into an output flow intended for a decoder. A corresponding decoding method is also provided.

10 Claims, 2 Drawing Sheets

(56) References Cited

OTHER PUBLICATIONS

Bystrom et al., "Efficient mode selection for H.264 complexity reduction in a Bayesian framework," Signal Processing, Image Communication, Elsevier Science Publishers, Amsterdam, NL, pp. 71-86 (Nov. 23, 2007).
Joint Video Team, "Text of Committee Draft of Joint Video Specification (ITU-T Rec. H-264 ISO/IEC 14496-10 AVC) MPEG02/N4810," ISO/IEC JTC1/SC29/WG11 MPEG02/N4810, Fairfax US, pp. 1-133 (May 1, 2002).
Jung et al., "Competition-Based Scheme for Motion Vector Selection and Coding," Joint Video Team (JVT) of ISO/IEC MPEG & ITU-T VCEG (ISO/IEC JTC1/SC29/WG11 and ITU-T SG16 Q6), retrieved from internet website: http://www.h265.net/, pp. 1-7 (Aug. 2, 2006).
Richardson et al., "Fast H.264 Skip Mode Selection Using an Estimation Framework," Picture Coding Symposium, Beijing, retrieved from internet website: http://www.rgu.ac.uk/files/richardson_fast_skip_estimation_pcs06.pdf, pp. 1-5 (Apr. 24, 2006).

* cited by examiner

MOTION ENCODING AND DECODING

CROSS-REFERENCE TO RELATED APPLICATIONS

This application is the U.S. national phase of the International Patent Application No. PCT/FR2008/052087 filed Nov. 19, 2008, which claims the benefit of French Application No. 07 08314 filed Nov. 28, 2007, the entire content of which is incorporated herein by reference.

BACKGROUND

This invention relates to image encoding and decoding techniques and more particularly to motion encoding and decoding.

Several existing methods enable a portion of a current image to be encoded relative to other portions of previously decoded images, according to a so-called "INTER" encoding mode. The current image portion is represented by luminance and chrominance information and information relating to the motion between this current image portion and a reference image portion. This enables the temporal correlations between the images to be exploited.

The motion information includes one or more components, e.g., like a translational motion vector, rotation, a pixel component and a subpixel component. Encoding generally includes the determination of information for reconstructing the motion components. For example, a motion vector is predicted and the information for the reconstruction comprises the prediction function identifier used as well as a remainder corresponding to the difference between the prediction and the original motion vector.

The reconstruction information likewise includes other information of various types which enable the components of the motion to be obtained from the decoder. For example, this information is called related or "side information" and consolidates size parameters, function identifiers to be used or others.

This reconstruction information is transmitted to the decoder.

The decoder reconstructs the various components of the estimated motion, i.e., applies the reverse prediction, and combines the result with the remainder and the related information. The decoder next applies the motion components with the reference image portion and combines the result with the luminance and chrominance information in order to obtain the decoded image.

The motion components are information the size of which increases with the resolution of the images, and the information for reconstructing these components occupies a significant portion of the bandwidth.

This poses problems, particularly in environments where the bandwidth is limited, such as wireless environments.

SUMMARY

One object of this invention is to improve this situation by enabling motion information to be transmitted using less bandwidth.

To that end, one object of the invention is a method of encoding at least a portion of a current image including an estimation of motion between the current image portion and a plurality of candidate image portions in order to form motion components, an evaluation of a performance criterion for each candidate image portion, and selection of a reference image portion from among the candidate image portions using said performance criteria, and insertion of encoding information into an output flow intended for a decoder, characterized in that, for at least one motion component, the motion estimation, the performance criteria evaluation and the reference image portion selection use only information considered to be available at said decoder and no motion information is inserted into said output flow.

Correspondingly, another object of the invention is a method of decoding at least one portion of a current image, characterized in that it includes receipt of a flow of encoding information for the current image portion, a motion estimation for the current image portion from a plurality of candidate reference image portions and already decoded image portions, in order to form corresponding motion components, an evaluation of a performance criterion for each candidate image portion, a selection from among said candidate image portions using said criteria in order to obtain said reference image portion, and decoding of the current image portion from said reference image portion and the corresponding motion components.

In this way, the encoder uses only information available at the decoder and the decoder reproduces the calculations performed by the encoder. Consequently, for at least one motion component, no reconstruction information for said component must be transmitted, thereby making it possible to save bandwidth.

In an alternative to the encoding method, said estimation delivers several motion components and the method further comprises determination of information for reconstructing at least one of said motion components and the insertion of this reconstruction information into the output flow.

Correspondingly, the decoding method includes the receipt of the reconstruction information and the corresponding reconstruction of a motion component.

The method is thus combined with the existing methods.

In one particular embodiment of the encoding and decoding methods, the motion estimation and the performance criteria evaluation use correlations between fragments of the candidate image portions and adjacent and separate corresponding fragments of the current image portion.

In another particular embodiment of the encoding and decoding methods, the motion estimation and the performance criteria evaluation use correlations between adjacent and separate corresponding fragments of the candidate image portions and adjacent and separate corresponding fragments of the current image portion.

Another object of the invention are computer programs and devices corresponding to these encoding and decoding methods.

BRIEF DESCRIPTION OF THE DRAWINGS

Other features and advantages of this invention will become apparent in the description provided below for non-limiting purposes and with reference to the appended drawings, in which.

DETAILED DESCRIPTION

Figure 1:
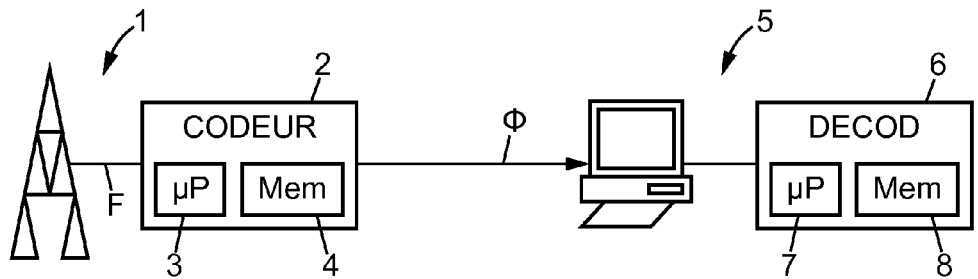
FIG. 1 is a diagram showing two communication stations provided with a video encoder and decoder, respectively.

The invention is applicable to any image encoding and decoding system, e.g., such as the system shown with reference to FIG. 1. This system enables a video sequence of a digital television data flow F to be encoded and the transmission of same from a transmitter 1 containing a video encoder 2 comprising a controller or computer 3 associated with a memory 4. The transmission is made to a receiving station 5 containing a decoder 6 likewise comprising a controller or computer 7 and a memory 8.

For example, the transmitter 1 comprises an antenna transmitting a flow of data Φ in a format such as the so-called DVB format, over a digital television microwave channel, and the station 5 is a personal computer.

Figure 2:
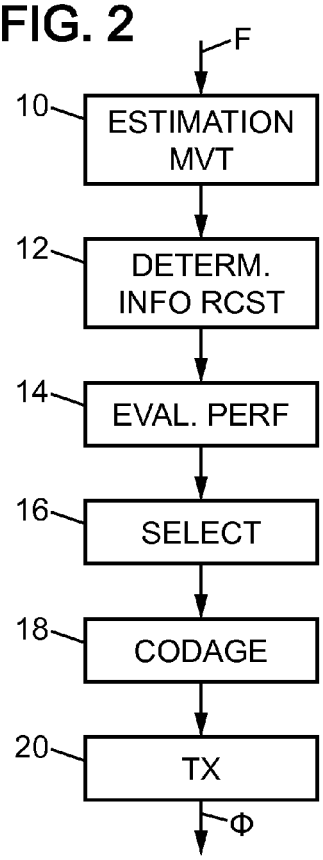
FIG. 2 is a flowchart of the encoding method according to one embodiment of the invention.

The method of the invention with regard to encoding will now be described with reference to FIG. 2.

The encoder 2 receives the flow F of image data for a video sequence. This flow is processed so as to encode each image or image portion. The term image portion generally designates an element of the video sequence. Based on the standards used, the term image can be replaced equally by the term frame and the term portion by the term block or macro block.

The encoding method begins with a step 10 of estimating motion between the current image portion and candidate image portions. The candidate image portions, for example, are the corresponding or adjacent portions of the current image portion in a previous image. Motion components, e.g., such as motion vectors, are obtained from the estimation 10 for each candidate image portion.

In the embodiment described, the motion estimation implements only information considered to be available at the decoder.

In this case, information considered to be available at the decoder is understood to mean information that the decoder estimates or knows has been decoded. This involves information transmitted previously and for which no error message has been received or for which a positive confirmation of receipt has been received, or else information stored simultaneously in the encoder and decoder.

Various motion estimations are described with reference to FIGS. 3A to 3C.

Figure 3A:
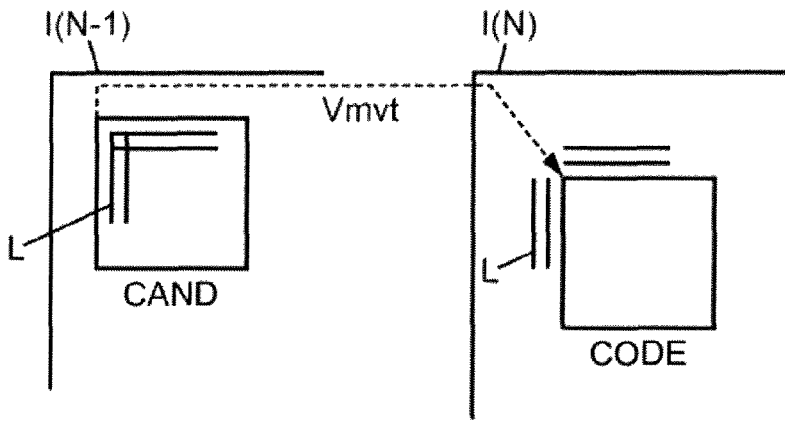
FIGS. 3A, 3B and 3C represent various embodiments of a particular step of the encoding method.
Figure 3B:
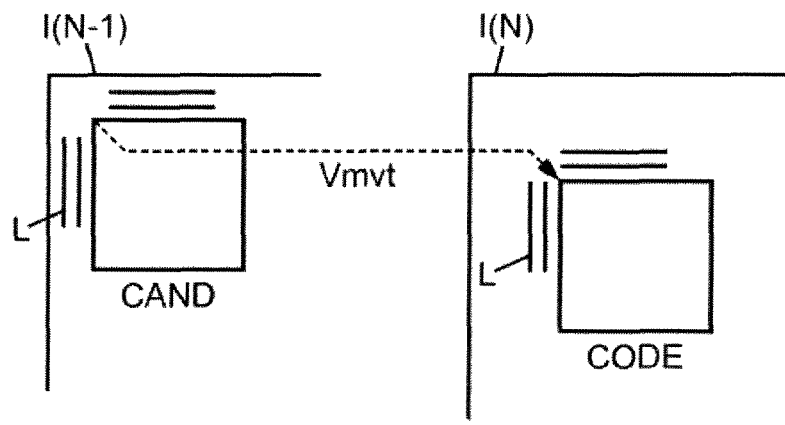
Figure 3C:
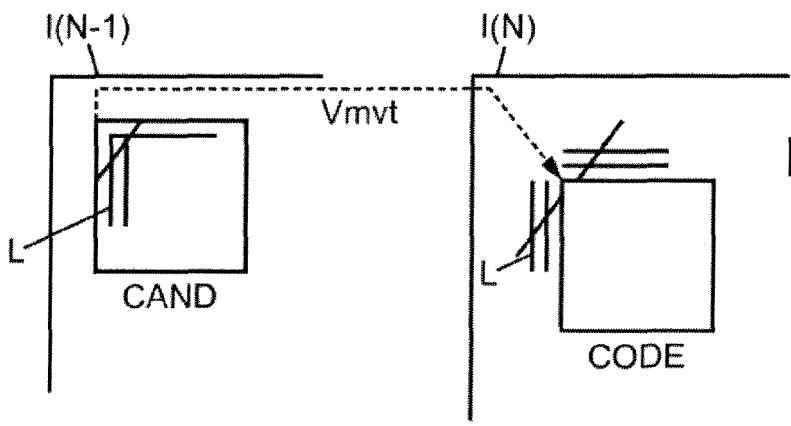

In the example described in FIG. 3A, the motion estimation is based on a so-called technique of matching or correlating blocks or lines (block/line matching). For each candidate image portion CAND of a previous image I(N−1), a motion vector Vmvt is estimated by taking account of blocks or lines L of the candidate image portion which are located in separate but adjacent portions of the portion to be encoded CODE on the current image I(N). These separate and adjacent portions are image portions that have already been transmitted and that the encoder estimates are available at the decoder.

In the example described with reference to FIG. 3B, the same principle is applied to lines L of the candidate image portion CAND which are separate and adjacent and to separate and adjacent corresponding lines of the image portion to be encoded CODE.

In the example described with reference to FIG. 3C, the motion estimation is based on correlations between contours (pattern matching) of image fragments belonging to candidate image portions CAND of a previous image and the same contours on separate and adjacent fragments of the current image of the image portion to be encoded CODE.

The motion estimation algorithms enabling motion vectors to be obtained from this data are known per se and will not be described in detail here. In the example, the motion components are considered to include a translation vector and a rotation.

At the end of the motion estimation step 10, motion components are obtained for each candidate image portion.

In the embodiment described, the motion estimation is followed by the determination of information for reconstructing each motion component. For example, this involves the determination of the most suitable prediction functions, a remainder which represents the difference between the image portion to be encoded and a candidate image portion transformed by the prediction function or else related information also known as "side information". This reconstruction information is calculated in a per se conventional manner.

The method next includes a step 14 of evaluating a performance criterion for each candidate image portion. This evaluation implements a criterion using only information considered to be available at the decoder.

As a matter of fact, unlike the selections of the prior art, the performance criterion cannot be based on the distortion of the current image portion because the latter is not available at the decoder.

In the examples described with reference to FIGS. 3A and 3B, a usable performance criterion is the absolute sum of the differences between the lines L on the previous image and the corresponding lines on the current image.

In the example described with reference to FIG. 3C, a usable performance criterion is the absolute sum of the differences between the lines weighted by the contour information.

A performance criterion is thus calculated for each candidate image portion from information available at the decoder.

In the embodiment described, the reconstruction information is likewise available and can be used to calculate the performance criterion. However, it is appropriate for the reconstruction information used to be available at the decoder. For example, the remainder cannot be used.

The method next includes a selection 16 aiming to retain one reference image portion from among the candidate image portions. This selection is based on the previously obtained performance criteria. Following the example of the motion estimation 10 and the performance evaluation 14, the selection operation 16 uses only information considered to be available at the decoder. In particular, the selection operation does not use the remainder information.

For example, the selection operation consists in retaining the candidate image portion with the best performance evaluation. Alternatively, the selection is based on the performance evaluation weighted by the available bandwidth. This enables the best compromise to be selected between image quality and throughput.

At the end of the selection operation 16, a reference image portion is thus available as well as the associated motion components and the information for reconstructing these components.

The encoding method next includes a step 18 of encoding information not relating to motion, such as the chrominance and luminance. In certain embodiments, this step 18 uses the motion components or reconstruction information to encode information such as luminance. In one embodiment, the motion vector associated with the reference image portion is used. This step 18 is implemented in a per se conventional manner and will not be described in greater detail.

Finally, the method comprises a step 20 of transmitting flow Φ to the decoder. In the example described, none of the information for reconstructing the motion components is inserted into the output flow. In particular, neither the motion vector prediction remainders nor the reference image portion identifiers are inserted into the output flow, whereby a significant fraction of the bandwidth is available.

The information relating to encoding the other parameters of the image, such as the luminance and chrominance information, is inserted into this output flow conventionally, during this step 20.

In this way, the fact that the motion estimation, the performance criteria evaluation and the selection of a reference image portion use only information considered to be available at the decoder, makes it possible to not transmit the information for reconstructing the motion components. Consequently, the transmission of motion information requires less bandwidth.

Figure 4:
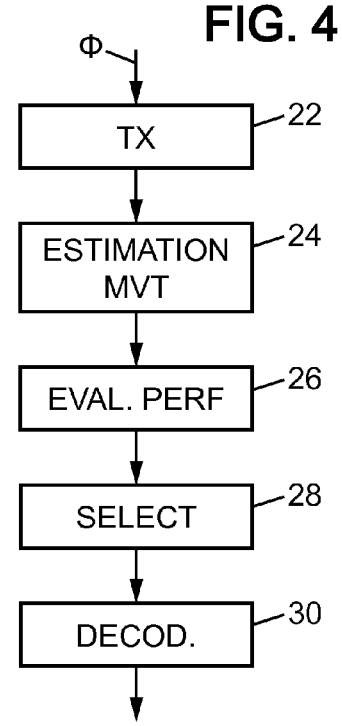
FIG. 4 is a flowchart of the decoding method according to one embodiment of the invention.

The corresponding decoding method will now be described with reference to FIG. 4.

During a step 22, the flow Φ is received by the decoder. As indicated previously, in this embodiment, the flow does not contain any information for reconstructing the motion components.

The decoding method begins with a step 24 of estimating motion for the current image portion. This estimation is carried out identically to that carried out during the encoding operation described with reference to step 10 of FIG. 2.

In this way, the motion estimation uses the already decoded information to evaluate a motion vector for each candidate image portion and the current image portion. The line-correlating and contour-correlating techniques described previously with reference to FIGS. 3A to 3C are directly applicable.

Of course, the motion estimation method used by the decoder during step 24 must be the same as that used by the encoder during step 10.

In a manner identical to the motion estimation carried out during encoding, the motion estimation 24 delivers motion components, such as motion vectors, for each candidate reference image portion.

The decoding method next includes a step 26 of evaluating a performance criterion for each candidate image portion. This evaluation is carried out according to the same methods as the evaluation 14 implemented during the encoding operation.

Consequently, one performance criterion is associated with each candidate image portion.

The evaluation of performance criteria is followed by a selection 28 which is identical in every respect to the previously described selection step 16.

The motion estimation 24, performance criteria evaluation 26 and selection operation 28 are thus carried out identically by the encoder and the decoder. This is made possible by the fact that these operations use only information considered to be available at the decoder.

At the end of step 28, the decoder thus possesses a reference image portion and associated motion components, without it having been necessary to transmit any information required for reconstructing the motion components.

The decoding method finally includes a step 30 of decoding the current image portion. During this step, the reference image portion is transformed by the associated motion components. This thus enables obtainment of the motion information for the current image portion.

Furthermore, the other parameters of the current image portion, such as the luminance and chrominance information, are obtained conventionally. In certain embodiments, the obtainment of this information requires the use of the motion vector and the reference image portion, as identified in steps 24 to 28.

In this way, the use of a single motion estimation, a single performance criteria evaluation and a single selection by the encoder and the decoder, makes the transmission of the motion information between the encoder and the decoder unnecessary.

In addition, other embodiments can be anticipated. In particular, it is possible to use other techniques for motion estimation, performance criteria evaluation and selection. In particular, techniques known by the names of "error concealment" or "inpainting" can be implemented. In any case, these techniques must use only data considered to be available at the decoder.

Alternatively, the step 12 of determining the information required for reconstruction is not carried out during the encoding operation. Such an embodiment enables the calculations by the encoder to be reduced. Conversely, the embodiment shown with reference to FIG. 2 enables the conventional order of the operations to be retained and limits the modifications to be made in the existing equipment. Furthermore, this enables the performance evaluation to be carried out using the reconstruction information.

In an alternative, the method is applied to only a portion of the motion components. Thus, a portion of the motion components is encoded conventionally, possibly by using information available solely at the encoder. For this portion of the motion components, the reconstruction information is transmitted. For the other portion encoded according to the principle of the invention, it is unnecessary to transmit the reconstruction information. For example, the reconstruction information for the rotation component is transmitted whereas that relating to the translation component is not. In another example, the reconstruction information for a pixel component is transmitted whereas that relating to a subpixel component is not.

In addition, in one particular embodiment, an identifier for the matching method used during the motion estimation operation is transmitted to the decoder. In this way, the decoder uses only information which is available thereto, but receives an identifier for the method to be used.

In yet another alternative, the candidate image portions are in the same image as the image portion to be encoded and decoded.

The invention claimed is:

1. A method of encoding a portion of a current image, said method being carried out by an encoder arranged to cooperate with a decoder and comprising:

an estimation of motion between fragments belonging to adjacent and separate portions of the current image portion and a plurality of candidate image portions of a previous image in order to form a first motion component, said estimation using only information considered to be available at said decoder, said information considered to be available at the decoder being information that the decoder estimates or knows has been decoded, such as information transmitted previously and for which no error message has been received or for which a positive confirmation of receipt has been received, or else information stored simultaneously in the encoder and decoder;

an evaluation of a performance criterion for each candidate image portion, said evaluation using only information considered to be available at said decoder;

a selection of a reference image portion from among the candidate image portions using said performance criteria, said selection using only information considered to be available at said decoder; and an insertion of encoding information such as chrominance and luminance into an output flow intended for the decoder, wherein, for an image portion, the motion estimation to form the first motion component, the evaluation of a performance criterion and the reference image portion selection are carried out in the same way for the encoding process and for a corresponding decoding process, wherein, the first motion component is not inserted into said output flow, for said at least one image portion, the motion estimation delivering several motion components, and wherein the method further includes a determination of information for reconstructing at least a second motion component and an insertion of said reconstruction information into the output flow.

2. The method as claimed in claim 1, wherein the motion estimation and the performance criteria evaluation use correlations between fragments of the candidate image portions and fragments belonging to adjacent and separate portions of the current image portion.

3. The method as claimed in claim 1, wherein the motion estimation and the performance criteria evaluation use correlations between adjacent and separate corresponding fragments of the candidate image portions and adjacent and separate corresponding fragments of the current image portion.

4. A non-transitory computer program product, comprising a computer usable medium having a computer readable program code embodied therein, said computer readable program code adapted to be executed to implement the method of claim 1.

5. A device for encoding a portion of a current image arranged to cooperate with a decoder and comprising:
   an estimator of motion between fragments belonging to adjacent and separate portions of the current image portion and a plurality of candidate reference image portions, in order to form a first motion component, said estimator being arranged to use only information considered to be available at said decoder, said information considered to be available at the decoder being information that the decoder estimates or knows has been decoded, such as information transmitted previously and for which no error message has been received or for which a positive confirmation of receipt has been received, or else information stored simultaneously in the device for encoding and decoder;
   a unit for evaluating a performance criterion for each candidate image portion, said unit for evaluating being arranged to use only information considered to be available at said decoder;
   a selector of a reference image portion from among the candidate portions using said performance criteria, said selector being arranged to use only information considered to be available at said decoder; and
   a communication unit for inserting encoding information such as chrominance and luminance into an output flow intended for the decoder,
   wherein, for an image portion, the motion estimator, the evaluation unit of a performance criterion and the selector of a reference image portion operates in a same way in the encoding device and in a corresponding decoding device, and
   wherein, for said image portion, the coding device is arranged for not inserting the first motion component into the output flow, the motion estimator delivering several motion components, and
   the device further comprising a unit for determining information for reconstructing at least a second motion component and for inserting said reconstruction information into the output flow.

6. A method of decoding a portion of a current image portion, said method being carried out by a decoder arranged to cooperate with an encoder and comprising:
   receipt of a flow of encoding information such as chrominance and luminance for the current image portion;
   a motion estimation of at least a first motion component between fragments belonging to adjacent and separate portions of the current image portion and a plurality of candidate reference image portions of a previous image, in order to form motion components, said estimation using only information being available at said decoder, said information being available at the decoder being information that the encoder estimates or knows has been decoded, such as information transmitted previously and for which no error message has been received or for which a positive confirmation of receipt has been received, or else information stored simultaneously in the encoder and decoder;
   an evaluation of a performance criterion for each candidate image portion, said evaluation using only information being available at said decoder;
   a selection from among said candidate image portions using said criteria in order to obtain said reference image portion, said selection using only information being available at said decoder; and
   decoding of the current image portion from said reference image portion and the corresponding motion components,
   wherein the motion estimation, the evaluation of a performance criterion and the reference image portion selection being carried out in the same way for the decoding process and for a corresponding encoding process for the first motion component, and
   wherein the method further comprises a receipt of information for reconstructing at least a second motion component and a corresponding reconstruction.

7. The method as claimed in claim 6, wherein the motion estimation and the performance criteria evaluation use correlations between fragments of the candidate image portions and adjacent and separate corresponding fragments of the current image portion.

8. The method as claimed in claim 6, wherein the motion estimation and the performance criteria evaluation use correlations between adjacent and separate corresponding fragments of the candidate image portions and adjacent and separate corresponding fragments of the current image portion.

9. A non-transitory computer program product, comprising a computer usable medium having a computer readable program code embodied therein, said computer readable program code adapted to be executed to implement the method of claim 6.

10. A device for decoding a current image portion arranged to cooperate with an encoder and comprising:
   a communication unit for receiving encoding information such as chrominance and luminance for the current image portion;
   an estimator of motion of at least a first motion component between fragments belonging to adjacent and separate portions of the current image portion and a plurality of candidate reference image portions of a previous image, in order to form motion components, said estimator using only information being available at said device for decoding, said information being available at the device for decoding being information that the encoder estimates or knows has been decoded, such as information transmitted previously and for which no error message has been received or for which a positive confirmation of receipt has been received, or else information stored simultaneously in the encoder and device for decoding;

a unit for evaluating a performance criterion for each candidate image portion, said unit for evaluating using only information being available at said device for decoding;

a selector of said reference image portion from among said candidate image portions and using said performance criteria, said selector using only information being available at said device for decoding; and a decoder of the current image portion from said reference image portion and corresponding motion components, wherein the motion estimator, the unit for evaluating a performance criterion and selector being carried out in the same way at the decoding device and at a corresponding encoding device for the first motion component, the motion estimator delivering several motion components, and wherein the device further comprises a unit for determining information for reconstructing at least a second motion component and for inserting said reconstruction information into the output flow.

* * * * *